United States Patent
Gargi et al.

(10) Patent No.: US 6,754,731 B2
(45) Date of Patent: Jun. 22, 2004

(54) DEVICE SETTINGS BASED ON USAGE HISTORY

(75) Inventors: Ullas Gargi, Mountain View, CA (US); Rajesh K. Shenoy, San Jose, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 90 days.

(21) Appl. No.: 10/146,294

(22) Filed: May 14, 2002

(65) Prior Publication Data

US 2003/0217201 A1 Nov. 20, 2003

(51) Int. Cl.⁷ .............................................. G06F 13/00
(52) U.S. Cl. ................................. 710/16; 710/6; 710/8; 710/15; 710/58; 700/12
(58) Field of Search ....................... 710/8, 16, 6, 15, 710/58; 700/12

(56) References Cited

U.S. PATENT DOCUMENTS

| | | | | |
|---|---|---|---|---|
| 5,890,014 A | * | 3/1999 | Long | 710/8 |
| 6,098,098 A | * | 8/2000 | Sandahl et al. | 709/221 |
| 6,129,182 A | * | 10/2000 | Nakamura | 187/391 |
| 6,289,399 B1 | * | 9/2001 | Furuichi et al. | 710/6 |
| 6,388,777 B1 | * | 5/2002 | Miyajima | 358/486 |

* cited by examiner

Primary Examiner—Rehana Perveen

(57) ABSTRACT

A method for automatically determining device settings based on usage history. The method includes determining a characterization for a device operation in terms of a set of features and selecting a previous device operation having a characterization which is similar to the characterization of the device operation. The device settings which are associated with the characterization of the selected previous device operation may then be employed in performing the device operation.

23 Claims, 3 Drawing Sheets

DEVICE SETTINGS BASED ON USAGE HISTORY

BACKGROUND OF THE INVENTION

1. Field of Invention

The present invention pertains to the field of computer systems. More particularly, this invention relates to determining device settings.

2. Art Background

Computer systems typically include a variety of devices including devices that provide input and/or output functionality and/or interaction with users. Examples of such devices are numerous and include rendering devices including printers and displays, input devices including keyboards, mouse, tablet, etc., communication devices, and storage devices to name a few examples.

Devices in a computer system commonly provide a set of alterable operating characteristics. For example, a printer may provide alterable resolutions, paper options, color palates, fonts, etc. In another example, a display device may provide alterable resolutions, color palates, backgrounds, etc. In yet another example, a mouse may provide alterable button functions and tracking speeds, etc.

The operating characteristics of a device are typically controlled using a set of parameters that are commonly referred to as device settings. A computer system usually includes software that enables a user to alter device settings. For example, a computer system usually includes printer drivers which generate control panels which enable users to alter the device settings for printers. Similarly, a computer system usually includes driver programs for other devices that enable alteration of their device settings.

It is common for devices in a computer system to be employed under circumstances in which its users change device settings relatively frequently. Unfortunately, a relatively frequent use of control panels to change device settings usually wastes time and may increase user frustration.

SUMMARY OF THE INVENTION

A method is disclosed for automatically determining device settings based on usage history. The method includes determining a characterization for a device operation in terms of a set of features and selecting a previous device operation having a characterization which is similar to the characterization of the device operation. The device settings which are associated with the characterization of the selected previous device operation may then be employed in performing the device operation.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
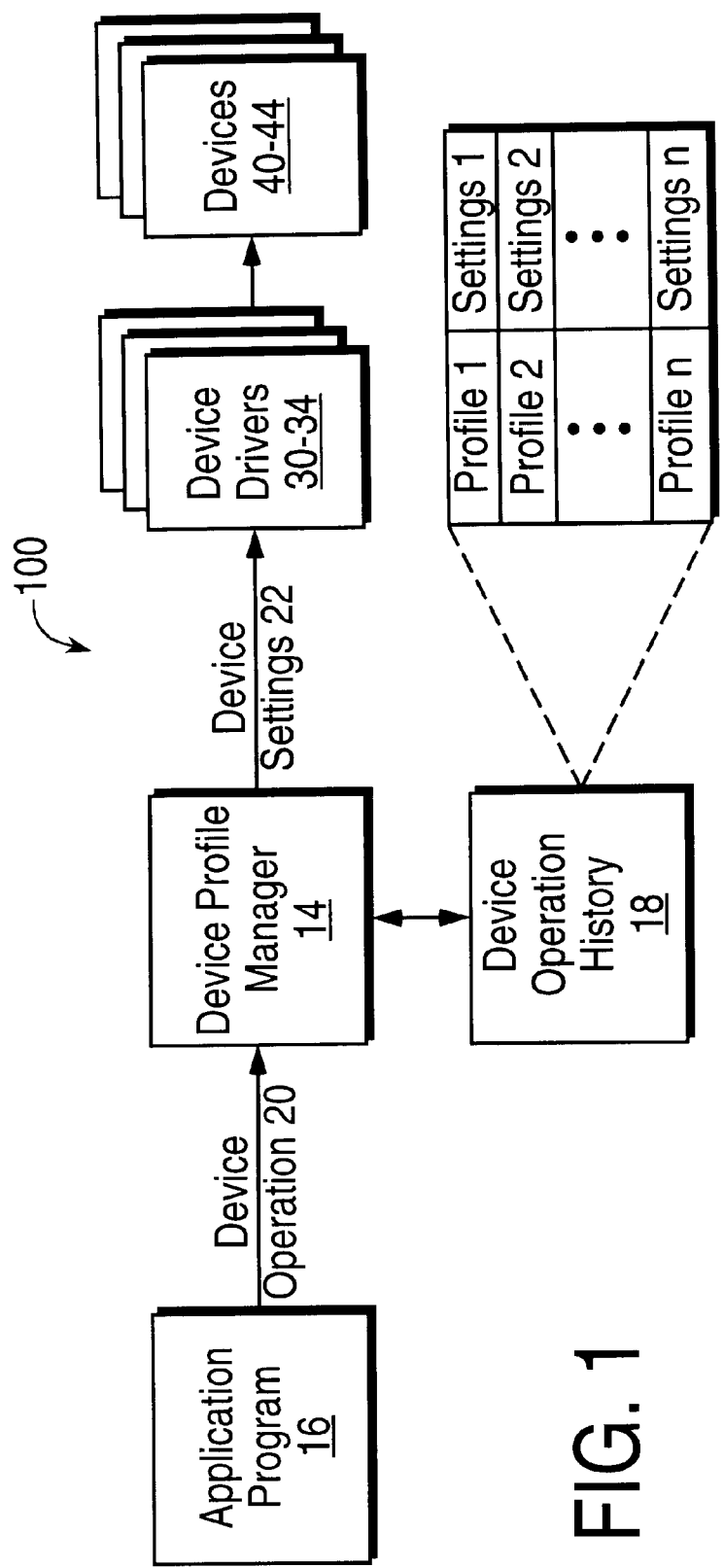
FIG. 1 shows a set of hardware and software elements of a computer system according to the present teachings.

FIG. 1 shows a set of hardware and software elements of a computer system 100 according to the present teachings. The computer system 100 includes a set of devices 40–44. The devices 40–44 may be devices that provide input and/or output functionality for the computer system 100. Software elements of the computer system 100 access the devices 40–44 via a corresponding set of device drivers 30–34.

Examples of the devices 40–44 are numerous and include printers, displays, input devices such as a keyboard, mouse, tablet, scanners, digital cameras, etc., communication devices such as modems, network interfaces, etc., and storage devices to name a few examples.

The computer system 100 further includes the appropriate hardware/software elements (not shown) for software execution such as processors, memory, mass storage, operating system, etc.

The computer system 100 executes an application program 16 that generates a device operation 20 which may be handled by one of the devices 40–44. The nature of the application program 16 and the device operation 20 depend on the nature of the devices 40–44. For example, if the devices 40–44 are printers then the application program 16 may be a word processing application, graphics application, etc., and the device operation 20 may be a print job. The device operation 20 is intercepted by a device profile manager 14. The device profile manager 14 determines a set of device settings 22 for use when the device operation 20 is performed. The device profile manager 14 determines the device settings 22 using a device operation history 18.

The device operation history 18 is a store that holds a set of profiles 1–n and a set of corresponding settings 1–n that provides a usage history of previous device operations. Each profile 1–n includes a set of information that characterizes a previous device operation. A previous device operation may have originated with the application program 16 or another application program. Each set of settings 1–n is a set of device settings used in the corresponding previous device operation which is associated with the profile 1–n.

The device profile manager 14 determines the device settings 22 by determining a set of features that characterize the device operation 20, matching these features to the information in the profiles 1–n. The settings 1–n having the closest matching profile 1–n are selected as a basis for the settings 22. This process may involve user interaction.

Figure 2:
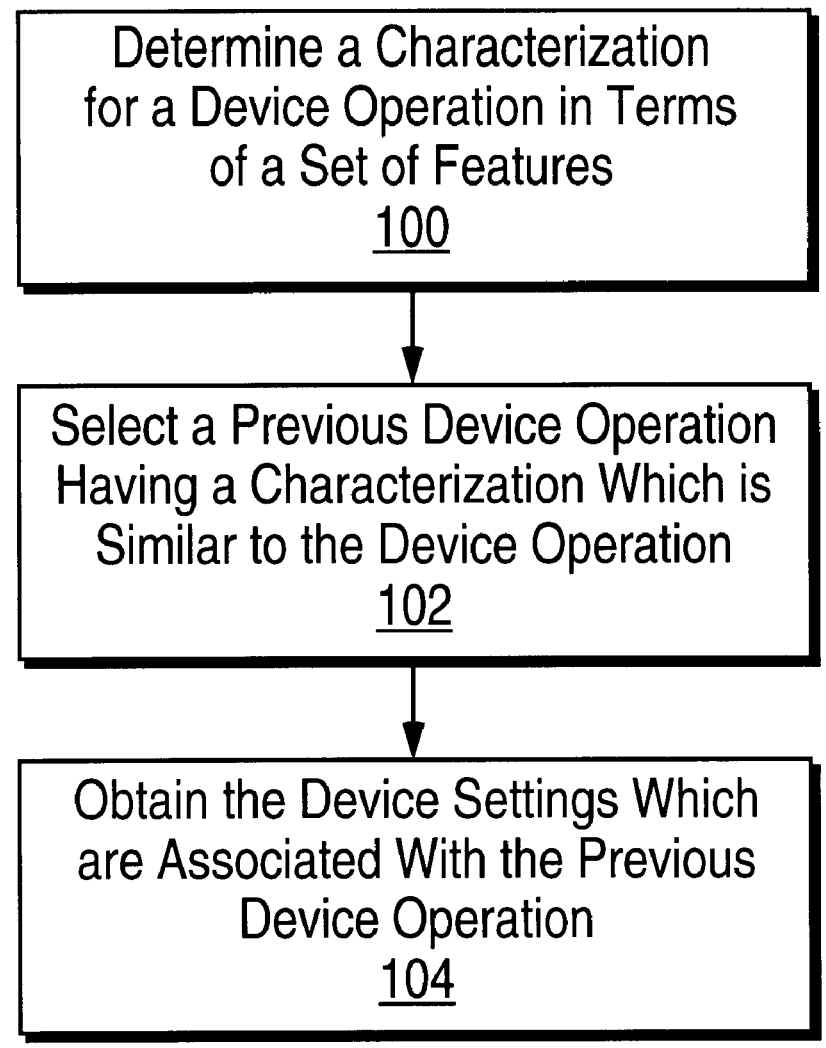
FIG. 2 shows a method for determining the device settings for a device operation according to the present techniques.

FIG. 2 shows a method for determining device settings for a device operation. The steps shown in one embodiment are performed by the device profile manager 14 when determining the device settings 22.

At step 100, a characterization of the device operation is determined in terms of a set of features. The features employed at step 100 are preselected to provide a characterization of a device operation that will enable an efficient comparison to similar past device operations. The selection of the features depend on the domain of a device operation and may be changed at any time.

In an embodiment in which a device operation is a print job then the features may include the name of the application program that originated the print job and the length of the print job. The features in such an example may also include the number of line graphics in the print job, the number of bit maps in the print job, an indication of color bit maps in the print job, and an indication of the complexity of any color bit maps in the print job, to name a few example features that may be employed.

At step 102, a previous device operation having a characterization which is similar to the characterization of the device operation is selected. In one embodiment, the characterizations for the previous device operations are included in the profiles 1–n and are compared to the characterization determined at step 100.

At step 104, the device settings which are associated with the previous device operation selected at step 102 are obtained for use in executing the device operation. These settings along with any modifications which may be obtained through user interaction may then be stored into the device operation history 18 for use in determining device settings for a subsequent device operation.

The following is based on an embodiment in which the device operation 20 is a print job. The device profile manager 14 in one embodiment determines the characterization for the device operation 20 at step 100 by performing an analysis of the device operation 20. The application program 16 in one embodiment generates a print job in graphics device interchange (GDI) format and the device profile manager 14 may convert the print job to another format such as a bitmap form or a PDF format prior to the analysis. Alternatively, the application program 16 may generate the print job in bitmap or PDF format.

One example of an analysis is the extraction of the name of the originating application from the print job, i.e. the name of the application program 16.

Another example of an analysis is a determination of the length of the print job. If the print job is a PDF format file then this analysis involves reading a page length field.

Another example of an analysis is a determination of the number of line graphics in the print job. A variety of well known techniques may be employed for this analysis particularly techniques that operate on bitmap format files.

Another example of an analysis is a determination of the number of bit maps in the print job. This analysis includes segmenting the print job, say in bitmap format, into graphics and non-graphics regions and counting the number of graphics boxes.

Yet another example of an analysis is a determination of a time-stamp for the print job. The time-stamp may be extracted from the print job or generated independently by the device profile manager 14.

Other examples of an analysis include a determination of an indication of color bit maps in the print job and a determination of an indication of the complexity of any color bit maps in the print job. This analysis may be performed using a variety of well known techniques for detecting and analyzing color bit maps in bitmap or PDF files.

In the following example, a device operation is a print job and the preselected features include an identifier of a user (user_ID) associated with the print job, the name (application_name) of the application program that originated the print job, the length (job_length) of the print job, the number of line graphics (line_graphics) in the print job, and the number of bit maps (bit_maps) in the print job.

The characterization determined for a device operation at step 100 in one embodiment is represented as a feature vector. An example feature vector for the device operation 20, a print job, is as follows:

| | |
|---|---|
| time_stamp: | 12:24:03 |
| application_name: | "word1" |
| user_ID: | "user B" |
| job_length: | 23333 |
| line_graphics: | 12000 |
| bit_maps: | 4 |

Figure 3:
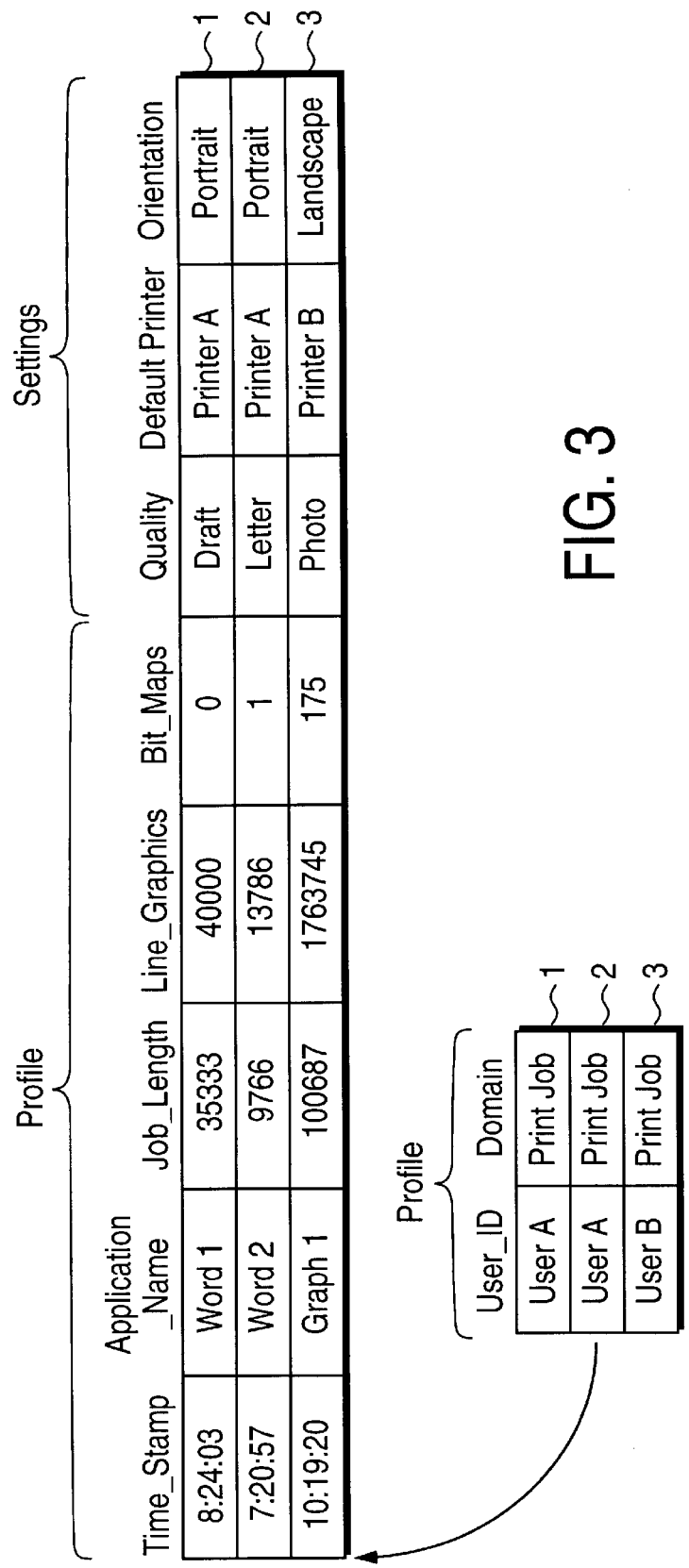
FIG. 3 shows an example set of profiles and corresponding settings contained in a device operation history.

FIG. 3 shows an example set of profiles 1–3 and corresponding settings 1–3 contained in the device operation history 18. Each profile 1–3 includes a domain which indicates, for example, whether the corresponding profile pertains to a print job, scan job, etc.

In this example for a print job, the settings 1–3 include an indication of print quality for the print job, an identifier for a default printer to be used for the print job, and an indication of page orientation for the print job.

The device profile manager 14 at step 102 compares the feature vector shown above for the device operation 20 to the corresponding features in the profiles 1–3 of the device operation history 18.

The time_stamp feature for the device operation 20 has its closest match to the profile 3. The application_name feature for the device operation 20 matches to the profile 1. The job_length, line_graphics, bit_maps features for the device operation 20 may be compared to the corresponding information in each of the profiles 1–3 by computing a distance metric based on their real number values. All of these comparisons may be combined into an overall metric for selecting one of the profiles 1–3 as the closest match to the feature vector of the device operation 20. Some of the features may be given higher weight in the metric—for example a matching application_name and/or a matching user_ID may be given greater weight than a matching job_length.

The device profile manager 14 at step 104 obtains the device settings from the selected profile 1–3 for use with the device operation 20. For example, if the profile selected at step 102 is the profile 1 then the settings 22 are quality=draft, default printer=Printer A, and page orientation=portrait. The device profile manager 14 may generate a control panel that enables a user to alter these settings. Alternatively, the device driver 30–34 which corresponds to the Printer A may generate the control panel.

The profiles 1–3 may include other information for characterizing past device operations including an indication of a domain associated with the past operations. The domain of the device operation 20 may be determined by the device profile manager 14 and compared to the domain indicators logged in the device operation history 18 at step 102.

The present techniques enable automatic selection of device settings based on user history. As devices become more complex, for example a printer with multiple finishing options (whether it is 2 up or 4 more, whether it is duplex, staple, collate etc.), multiple paper tray output options, multiple print quality options (for photo, letter, etc.), it becomes much more cumbersome for the user to determine the exact settings used for a satisfactory output. Furthermore, it is cumbersome for a user to determine what options were chosen in an earlier successful print output.

Similar problems may exist for a scanner device. For example, a user when scanning a photograph may want the best resolution to be used and the image converted to a JPEG format, but when copying a text document a medium resolution may be desired. In prior systems, the document would need to be saved in a tiff format.

Similar problems may exist for digital cameras. Some digital cameras allow the user to mark pictures with different intents one intent would be for email transmission, a second intent may be to compress and save it for uploading to a web, a third intent may be to send the picture for a print. Depending on the intent, different photographs would be saved differently in the camera. With the present techniques, a user of a camera would get the intents marked using a usage history thus reducing the interactions with the menus on the camera.

The features described above do not have to be predetermined at the time the device profile manager 14 is installed. For example, the features may be updated, i.e. added, removed, or modified, by a user or by third parties after installation. This may be accomplished using plug-ins which operate on a stream when determining the feature.

Initially, the computer system 100 may have a default setting for device operations. Print jobs, for example, may have default print setting or a different print setting for different types of jobs —just —just at a coarse level such for graphics, images and text. As the computer system 100 and its devices 40–44 are used, the user may reject the chosen settings. The computer system 100 automatically adds the usage to the device operation history 18.

The following are some more applications of the present techniques with respect to printers. The system may use the output tray corresponding to the paper type and stock used in the previous job with the similar characterization. In addition, the system may choose the finishing options of the print job corresponding to that used in a previous job with similar characterization.

In the case of scanners, the resolution of the scanned image and the format of file saving may be chosen based on a previous job with similar characteristics.

In the case of cameras, the recipient of the captured image may be chosen based on a previous image with similar characteristics.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for determining a set of device settings for a device operation, comprising the steps of:
   obtaining the device operation generated by an application program;
   selecting a previous device operation having a characterization which is similar to a characterization of the device operation;
   obtaining a set of device settings which are associated with the previous device operation.
2. The method of claim 1, wherein the step of selecting includes the step of determining the characterization of the device operation in terms of a set of features.
3. The method of claim 2, wherein the step of selecting includes the step of comparing the characterization of the device operation to a history of previous device operations.
4. The method of claim 3, further comprising the step of determining via user input a maximum length of time for which the previous device operation is to be held in the history.
5. The method of claim 3, wherein the step of comparing includes the step of applying one or more weights to one or more of the features.
6. The method of claim 4, further comprising the step of obtaining the weights via user input.
7. The method of claim 2, wherein the features include a name of an application program that originated the device operation.
8. The method of claim 2, wherein the features include a time-stamp associated with the device operation.
9. The method of claim 2, wherein the features include an identification of a user associated with the device operation.
10. The method of claim 1, further comprising the step of modifying the device settings in response to user input.
11. A computer system, comprising:
    device capable of performing a device operation generated by an application program;
    device profile manager that obtains the device operation from the application program and that selects a previous device operation having a characterization which is similar to a characterization of the device operation and that obtains a set of device settings which are associated with the characterization of the previous device operation for use when performing the device operation.
12. The computer system of claim 11, wherein the device profile manager determines the characterization of the device operation in terms of a set of features.
13. The computer system of claim 12, further comprising a device operation history that holds information pertaining to the previous device operation.
14. The computer system of claim 13, wherein the device profile manager obtains via user input a maximum length of time for which the previous device operation is to be held in the device operation history.
15. The computer system of claim 12, wherein the device profile manager applies one or more weights to one or more of the features when selecting the previous device operation.
16. The computer system of claim 15, wherein the device profile manager obtains the weights via user input.
17. The computer system of claim 12, wherein the features include an identification of the application program that originated the device operation.
18. The computer system of claim 12, wherein the features include a time-stamp associated with the device operation.
19. The computer system of claim 12, wherein the features include an identification of a user associated with the device operation.
20. The computer system of claim 11, wherein the device profile manager enables user modification to the device settings.
21. The computer system of claim 11, wherein the device is a printer.
22. The computer system of claim 11, wherein the device is a scanner.
23. The computer system of claim 11, wherein the device is a digital camera.

* * * * *